United States Patent
Liu et al.

(10) Patent No.: US 10,311,488 B2
(45) Date of Patent: Jun. 4, 2019

(54) SYSTEM AND METHOD FOR PROVIDING AUTOMATIC HIGH-VALUE LISTING FEEDS FOR ONLINE COMPUTER USERS

(71) Applicant: eBay Inc., San Jose, CA (US)

(72) Inventors: Shaobo Liu, Mountain View, CA (US); Tom (Xiaofeng) Tang, Cupertino, CA (US)

(73) Assignee: eBay Inc., San Jose, CA (US)

( * ) Notice: Subject to any disclaimer, the term of this patent is extended or adjusted under 35 U.S.C. 154(b) by 536 days.

(21) Appl. No.: 14/828,012

(22) Filed: Aug. 17, 2015

(65) Prior Publication Data
US 2016/0042410 A1    Feb. 11, 2016

Related U.S. Application Data

(63) Continuation of application No. 13/218,160, filed on Aug. 25, 2011, now Pat. No. 9,111,289.

(51) Int. Cl.
| | |
|---|---|
| *G06F 17/30* | (2006.01) |
| *G06F 16/00* | (2019.01) |
| *G06Q 30/02* | (2012.01) |
| *G06F 16/958* | (2019.01) |
| *G06F 16/9535* | (2019.01) |
| *G06F 16/435* | (2019.01) |

(52) U.S. Cl.
CPC ....... *G06Q 30/0276* (2013.01); *G06F 16/435* (2019.01); *G06F 16/958* (2019.01); *G06F 16/9535* (2019.01); *G06Q 30/02* (2013.01)

(58) Field of Classification Search
CPC .......... G06F 17/30867; G06F 17/3089; G06F 17/30029; G06Q 30/02; G06Q 30/0276
See application file for complete search history.

(56) References Cited

U.S. PATENT DOCUMENTS

| | | |
|---|---|---|
| 7,464,086 B2 | 12/2008 | Black et al. |
| 7,693,825 B2 | 4/2010 | Wang et al. |
| 7,693,827 B2 | 4/2010 | Zamir et al. |
| 7,953,740 B1 | 5/2011 | Vadon et al. |

(Continued)

OTHER PUBLICATIONS

Dreller, Understanding Keyword Match Types, searchengineland.com, 2010. (Year: 2010).*

(Continued)

*Primary Examiner* — James E Richardson
*Assistant Examiner* — Nirav K Khakhar
(74) *Attorney, Agent, or Firm* — Shook, Hardy & Bacon L.L.P.

(57) ABSTRACT

A system and method for providing automatic high-value listing feeds for online computer users is disclosed. A particular embodiment includes obtaining publisher information corresponding to a plurality of publisher content items from a plurality of publisher sites; obtaining merchant information including value information corresponding to the plurality of publisher content items; using a processor, the publisher information, and the merchant information to generate a set of high-value feeds for transfer to the plurality of publisher sites, the set of high-value feeds each being ranked corresponding to a quality score computed for each listing item of each high-value feed; and transferring the set of high-value feeds to corresponding publisher sites of the plurality of publisher sites.

20 Claims, 8 Drawing Sheets

(56) References Cited

U.S. PATENT DOCUMENTS

| | | |
|---|---|---|
| 9,111,289 B2 | 8/2015 | Liu et al. |
| 2003/0001880 A1 | 1/2003 | Holtz et al. |
| 2003/0061611 A1 | 3/2003 | Pendakur |
| 2005/0027666 A1 | 2/2005 | Beck, Jr. et al. |
| 2005/0273812 A1 | 12/2005 | Sakai et al. |
| 2006/0026147 A1 | 2/2006 | Cone et al. |
| 2007/0179933 A1 | 8/2007 | Lee et al. |
| 2009/0132345 A1 | 5/2009 | Meyssami et al. |
| 2010/0030734 A1 | 2/2010 | Chunilal |
| 2011/0153423 A1 | 6/2011 | Elvekrog et al. |
| 2012/0066261 A1 | 3/2012 | Saka |
| 2013/0054615 A1 | 2/2013 | Liu et al. |
| 2013/0073335 A1 | 3/2013 | Tang et al. |

OTHER PUBLICATIONS

Tellis, Keeping Web Users Safe by Sanitizing Input Data, smashingmagazine.com, 2011. (Year: 2011).*

Proffitt, What APIs Are and Why They're Important, readwrite.com, 2013. (Year: 2013).*

"U.S. Appl. No. 13/218,160, 312 Amendment filed Jul. 7, 2015", 27 pgs.

"U.S. Appl. No. 13/218,160, Final Office Action dated Jul. 1, 2013", 21 pgs.

"U.S. Appl. No. 13/218,160, Non Final Office Action dated Sep. 20, 2012", 19 pgs.

"U.S. Appl. No. 13/218,160, Notice of Allowance dated Apr. 2, 2015", 7 pgs.

"U.S. Appl. No. 13/218,160, PTO Response to Rule 312 Communication mailed Jul. 16, 2015", 2 pgs.

"U.S. Appl. No. 13/218,160, Response filed Jan. 2, 2014 to Final Office Action dated Jul. 1, 2013", 12 pgs.

"U.S. Appl. No. 13/218,160, Response filed Mar. 20, 2013 to Non Final Office Action dated Sep. 20, 2012", 12 pgs.

"U.S. Appl. No. 13/237,726, Final Office Action dated Jul. 29, 2015", 26 pgs.

"U.S. Appl. No. 13/237,726, Final Office Action dated Dec. 31, 2013" 16 pgs.

"U.S. Appl. No. 13/237,726, Non Final Office Action dated Jan. 7, 2013", 13 pgs.

"U.S. Appl. No. 13/237,726, Non Final Office Action dated Oct. 2, 2014", 15 pgs.

"U.S. Appl. No. 13/237,726, Response filed Apr. 2, 2015 to Non Final Office Action dated Oct. 2, 2014", 14 pgs.

"U.S. Appl. No. 13/237,726, Response filed Apr. 8, 2013 to Non Final Office Action dated Jan. 7, 2013", 43 pgs.

"U.S. Appl. No. 13/237,726, Response filed Apr. 30, 2014 to Final Office Action dated Dec. 31, 2013", 8 pgs.

"U.S. Appl. No. 13/237,726, Response filed Oct. 29, 2015 to Final Office Action dated Jul. 29, 2015", 17 pgs.

"U.S. Appl. No. 13/237,726, Non Final Office Action dated Mar. 15, 2016", 25 pgs.

* cited by examiner

SYSTEM AND METHOD FOR PROVIDING AUTOMATIC HIGH-VALUE LISTING FEEDS FOR ONLINE COMPUTER USERS

PRIORITY CLAIM

This application is a continuation of and claims the benefit of priority to U.S. patent application Ser. No. 13/218,160, filed on Aug. 25, 2011, entitled, "SYSTEM AND METHOD FOR PROVIDING AUTOMATIC HIGH-VALUE LISTING FEEDS FOR ONLINE COMPUTER USERS", which is hereby incorporated by reference herein in its entirety.

RELATED APPLICATION

This non-provisional patent application is related to the U.S. Non-Provisional patent application Ser. No. 13/237,726, filed on Sep. 20, 2011, entitled, "SYSTEM AND METHOD FOR LINKING KEYWORDS WITH USER PROFILING AND ITEM CATEGORIES", and assigned to the same assignee as the present patent application.

TECHNICAL FIELD

This application relates to a method and system for use with an electronic commerce system, according to one embodiment, and more specifically, for providing automatic high-value listing feeds for online computer users.

BACKGROUND

On-line commerce sites on a wide-area public network (e.g., the Internet) often share information regarding products or services for sale and purchasers who seek to purchase the offered products or services. For example, search engines (e.g. Google) will pull content from on-line commerce sites, advertising sites, and/or content sites that may have product/service information, listings, or advertising related to search terms entered by a user of the search engine. As a result, the search engines can receive content feeds from a variety of content sources. Depending on the number of users and the search terms entered by users of the search engine, these content feeds can produce an extremely large amount of data. It is often necessary for the amount of data transferred by these content feeds to be limited by the search engine, the content source, or the nodes in the network infrastructure. However, the content feeds are typically limited in an arbitrary manner. As a result, the best product/service information, listings, or advertising related to search terms entered by a user may be lost.

Thus, a system and method for providing automatic high-value listing feeds for online computer users is needed.

BRIEF DESCRIPTION OF THE DRAWINGS

The various embodiments is illustrated by way of example, and not by way of limitation, in the figures of the accompanying drawings in which.

DETAILED DESCRIPTION

Figure 1:
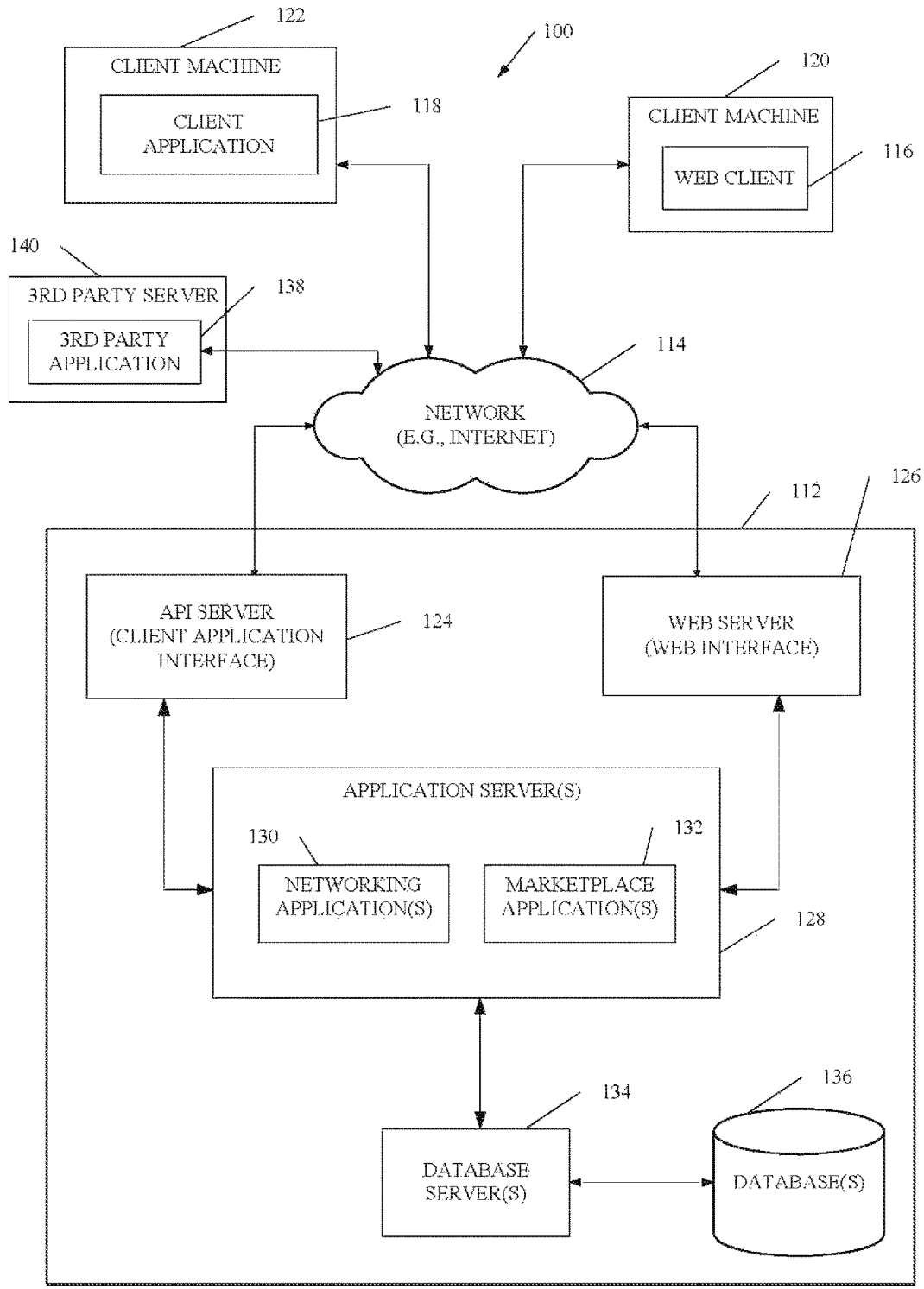
FIG. 1 is a network diagram depicting a network system, according to one embodiment, having a client-server architecture configured for exchanging data over a network.

In the following description, for purposes of explanation, numerous specific details are set forth in order to provide a thorough understanding of the various embodiments. It will be evident, however, to one of ordinary skill in the art that the various embodiments may be practiced without these specific details.

In one embodiment, a system and method for providing automatic high-value listing feeds for online computer users is disclosed. In various example embodiments, a feed distribution network aims to simplify, facilitate, and improve the efficiency of the transfer of product/service information, listings, or advertising from a host site, such as a feed distribution network site, an on-line commerce site, an auction site, a publisher site, a merchant site, or other product/service or broker site. A particular embodiment can use an application programming interface (API) that can make use of host site search and other API's to provide search results to e-commerce users in a more valuable listing and format. Search results and can be customized according to keyword data, historical user conversion data, user profile information associated with one or more consumers, and information related to particular products, listings, and/or advertisements.

In a particular example embodiment, the host can generate content feeds (also denoted traffic) and send traffic to publishers or affiliates, such as Google. The quantity of traffic can be high-volume, so it is beneficial to only send the most high-value feeds as possible. High-value feeds are those that have a high probability of conversion. Conversion is an act of a consumer that indicates interest in a particular item. The high-value feeds can be identified by mapping keywords to listings included in the feeds. High value keywords found in listings included in the feeds is indicative of a high-value feed. High-value keywords are those that have a high probability of conversion based on historical data. A keyword matching process can be used to match the keywords to listings and produce a high-value feed: 1) map each keyword to a listing set, 2) order each listing set by a quality score, 3) restrict or truncate the ordered listing set at a boundary n, where n is determined based on a weighted value of keywords, 4) de-dupe feeds having the same listing in multiple feeds so a listing is only in one feed, and 5) send the high-value feeds, wherein each feed includes listings and a quality score for each listing.

In a particular example embodiment, a central data repository or database 404 can use well-known screen-scraping techniques and application programming interfaces (API's) to collect product or item data from source sites, such as publisher sites and merchant sites. The feed distribution network can analyze this collected data to create a high-value set of item listings for delivery to the publisher sites. The high-value set of item listings enables merchants to bid for item placement on the publisher site. The appropriate combinations of content of the item listings can be exposed to a particular consumer based on the site being used to view the item listing and the bids placed by corresponding merchants.

Applications for the described system and method include cataloging systems, merchandising systems, and search systems, among other applications. Conventional systems and methods don't pro-actively and automatically gather and produce high-value feeds to enable merchants to obtain a desired ad placement.

FIG. 1 is a network diagram depicting a network system 100, according to one embodiment, having a client-server architecture configured for exchanging data over a network. For example, the network system 100 may be a trading/commerce system where clients may communicate and exchange data with the trading/commerce system, the data may pertain to various functions (e.g., online purchases) and aspects (e.g., managing social networks) associated with the network system 100. Although illustrated herein as a client-server architecture for simplicity, in other embodiments the network architecture may vary and include an architecture such as a peer machine in a peer-to-peer (or distributed) network environment.

Returning to FIG. 1, a data exchange platform, in an example form of a network-based provider (or host system/site) 112, provides server-side functionality, via a network 114 (e.g., the Internet) to one or more clients. The one or more clients may include users that may utilize the network system 100 and more specifically, the network-based provider 112, to exchange data over the network 114. These transactions may include transmitting, receiving (communicating) and processing data to and from the multitude of users. The data may include, but is not limited to, user preference information, user profile information, ad search queries, search keywords, shopping or listing context information and/or identifiers, context data, notations (e.g., personal and public shopping notes), context filter data, shared electronic shopping carts, product and service reviews, product, service, manufacture, and vendor recommendations and identifiers, product and service listings associated with buyers and sellers, auction bids, feedback, etc. In one embodiment, the user profile information can be associated with one or more contexts generated by a user or other users and maintained on the network-based provider 112. Data associated with a user profile, such as any of the data described above, may be publicly shared as determined by the originator of the data.

Turning specifically to the network-based marketplace 112, an application program interface (API) server 124 and a web server 126 are coupled to, and provide programmatic and web interfaces respectively to, one or more application servers 128. The application servers 128 host one or more networking application(s) 130 and marketplace application(s) 132. The application servers 128 are, in turn, shown to be coupled to one or more databases servers 134 that facilitate access to one or more databases 136.

In one embodiment, the web server 126 may send and receive data pertaining to a user profile or item listing via a toolbar installed on a browser application. The toolbar may allow for a user or a third party to, inter alia, create a new user profile (a profile creator), selectively add a uniform resource locator (URL) associated with the created user profile, and create notations regarding research and general matters associated with the user profile. In other embodiments, the web server may serve a page or the API server 124 in conjunction with the client application 118 may provide the same or similar functionality as that described with reference to the toolbar. It may be noted that using a toolbar within an application such as a browser or stand alone application is well known in the art.

The marketplace application(s) 132 may provide a number of marketplace functions and services (e.g., item listings, searching, advertisement, payment, etc.) to users that access the network-based marketplace 112. The networking application(s) 130 likewise may provide a number of consumer services, merchant services, or social networking services and functions to users. The networking application(s) 130 may allow a user to generate one or more contexts related to shopping or advertisement (ad) generation, which may include listings (e.g., for products and services) couched as a broad category associated with a consumer, a class of consumers, and/or an item (e.g., a product or service or a listing for a product or service) or class of items. Additionally, listings can be couched as associated with a specific consumer or a specific item. For example, listings in the form of a category could be, "digital cameras" or "plumbers." Similarly, a context can include a user profile associated with a category of users or a specific user. For example, a user profile in the form of a category could be, "women over 40 years old" or "purchasers of digital cameras." An example of a user profile in a more specific form may be, "a user profile for John A. Smith of Akron, OH" or "purchasers of Canon digital cameras." The level of specificity may vary and is selectable by the user profile creator or administrator of the feed distribution engine of a particular embodiment. For example, the user profile can be as specific as a particular person or the associated listing associated with a make, model, additional specific attributes or features of a specific item or service offered for sale or lease.

In one embodiment, the networking application(s) 130 and marketplace application(s) 132 may provide a client (e.g., web client 116) with an interface that includes input fields for personality or item/listing attributes most commonly selected by other users as the most important or most determinative attributes related to the products/services which a user/consumer is seeking or selling. For example, a multitude of users may have indicated they thought the most important personality attributes for the user profile include information related to: 1) consumer/user need, 2) general consumer/user personality, 3) consumer/user shopping attitude, and 4) consumer/user budget. A multitude of other users may have indicated they thought the most important item attributes for a digital camera purchaser user profile include: 1) digital camera brand, 2) pixel count, 3) zoom, and 4) size. These user profile attributes may be independently developed or discovered by the network-based marketplace 112 by processing the attribute data received from the multitude of users or may be based on the user profile creator ranking the attributes or a combination thereof.

The networking application(s) 130 may allow the user profile creator or feed distribution engine user to distribute the one or more user profiles to one or more groups defined by the user profile creator or feed distribution engine user (e.g., "my family," "my friends," etc.) or to groups at various levels in a predefined category (e.g., "photography group," "digital camera group," or "Canon digital camera group," etc.).

While the networking application(s) 130 and the marketplace application(s) 132 are shown in FIG. 1 to form part of the network-based marketplace 112, it will be appreciated that, in alternative embodiments, the networking application(s) 130 may form part of a social networking service that is separate and distinct from the network-based marketplace 112.

FIG. 1 also illustrates a third party application 138, executing on a third party server machine 140, as having programmatic access to the network-based marketplace 112 via the programmatic interface provided by the API server 124. For example, the third party application 138 may, utilizing information retrieved from the network-based marketplace 112, support one or more features or functions on a website hosted by the third party. The third party website may, for example, provide one or more networking, marketplace or payment functions that are supported by the relevant applications of the network-based marketplace 112.

Figure 2:
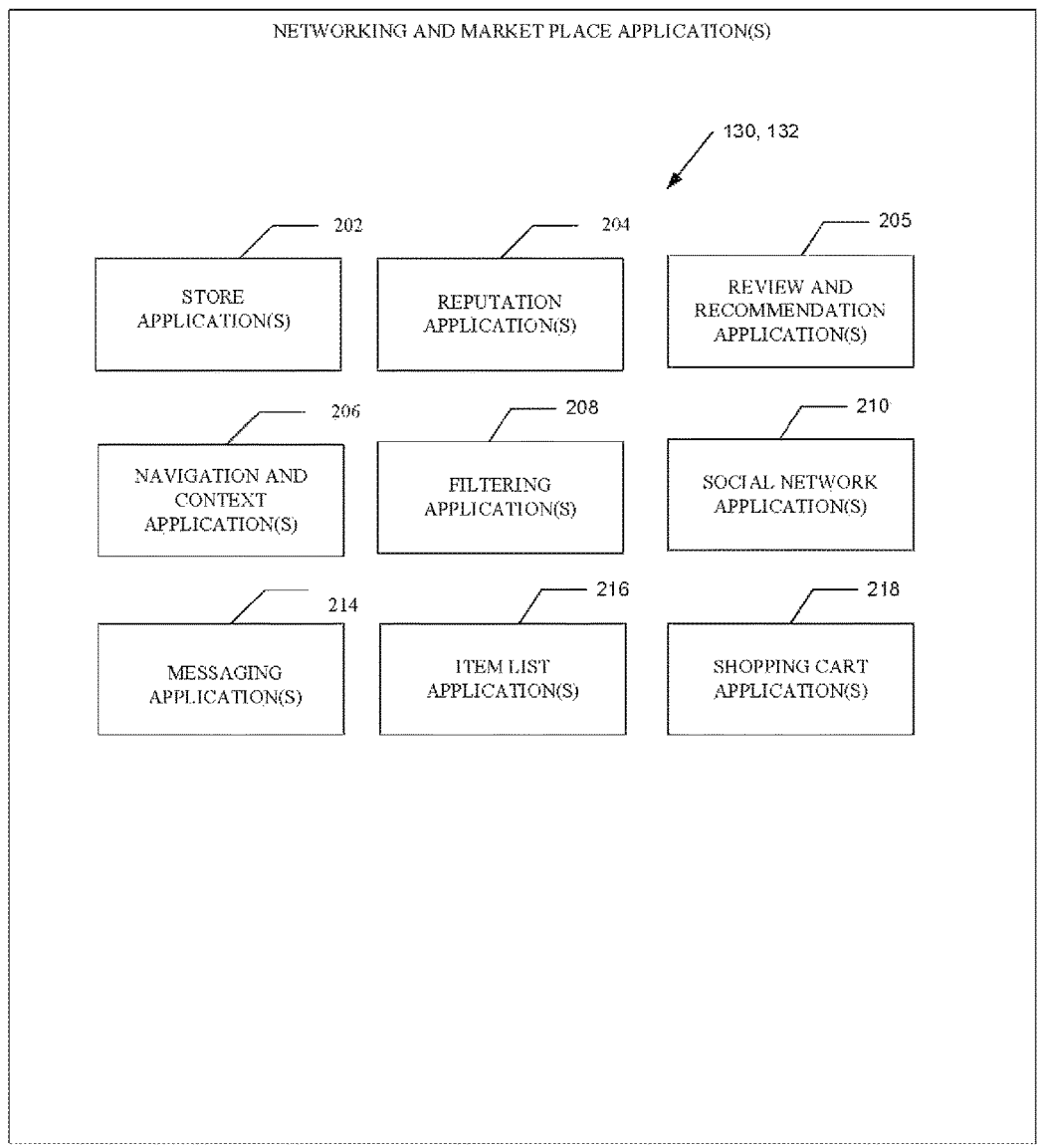
FIG. 2 is a block diagram illustrating an example embodiment of multiple network and marketplace applications, respectively, which are provided as part of a network-based marketplace.

FIG. 2 is a block diagram illustrating an example embodiment of multiple network and marketplace application(s) 130 and 132, respectively, which are provided as part of the network-based marketplace 112. The network-based marketplace 112 may provide a number of feeds or listings for goods and/or services, category-based shopping, social networking, and purchase and bidding systems, various levels of features provided for users, and price-setting mechanisms whereby a seller may list goods and/or services (e.g., for sale, bid, or lease) and a buyer may buy or bid on listed goods and/or services. A user profile and context associated with a user shopping or listing an item in the network-based marketplace 112 may offer or provide information that may be helpful in assisting the feed distribution engine user in customizing their shopping or listing experience pertaining to the user profile or listing information (i.e., context). Among various embodiments, the recommendations, reviews, or research notes corresponding to the user profile or listing information may be directed from another user to one or more users desiring data associated with the user profile or listing information or the data may be provided from storage by the network and marketplace application(s) 130 and 132 based on the user profile or listing information provided by a user. The data may be provided based on a request from the user profile creator or automatically pushed to the user profile creator based on policy or a user configuration file.

To this end, the network and marketplace application(s) 130 and 132, respectively, are shown to include one or more application(s) which support the network-based marketplace 112, and more specifically the generation and maintenance of one or more user profiles provided by users of the network-based marketplace 112 or feed distribution engine users. These applications can include support for activities associated with the user profiles and listing information, including storing and retrieving user notes, web sites (URLs), links associated with related tags, research and notes from other users and community members, related community groups, vendors, providing localized geographic data for user profiles (e.g., regional or country-specific consumer purchasing patterns), etc. Additionally, the various applications may support social networking functions, including building and maintaining the community groups created by a user, which may be helpful in providing various types of data (e.g., reviews, notes, local services, consumer information, etc.) pertaining to the user profiles and listing information.

Store application(s) 202 may allow sellers to group their listings (e.g., goods and/or services) within a "virtual" store, which may be branded and otherwise personalized by and for the sellers. Such a virtual store may also offer promotions, incentives and features that are specific and personalized to a relevant seller and consumer. In one embodiment, based on the user profiles provided by the user profile creator, the virtual store may be provided to the user profile creator or feed distribution engine user where the virtual store may carry or sell an item or service related to a user's need based on the user profile.

Reputation application(s) 204 may allow parties that transact utilizing the network-based marketplace 112 to establish, build, and maintain reputations, which may be made available and published to potential trading partners. Consider that where, for example, the network-based marketplace 112 supports person-to-person trading, users may have no history or other reference information whereby the trustworthiness and/or credibility of potential trading partners may be assessed. The reputation application(s) 204 may allow a user, for example through feedback provided by other transaction partners, to establish a reputation within the network-based marketplace 112 over time. Other potential trading partners may then reference such a reputation for the purposes of assessing credibility, trustworthiness, or the like. A user creating a user profile and seeking reviews, research (e.g., notes, etc.), and recommendations associated with the profile may filter the result data from the search or context submission based on reputation data. For example, the user profile creator may only want profile data such as reviews and research notes pertaining to the user profile from other users with a greater than 3 out of 5 star reputation rating.

In one embodiment, the network-based marketplace 112 includes review and recommendation application(s) 205. The social networking application(s) 210 may work in conjunction with the review and recommendation application(s) 205 to provide a user interface to facilitate the entry of reviews of the user profile data received from other users. A review may be a text entry of the community group member's opinion, a standard review form including check boxes indicating a level satisfaction, or a combination of both, etc. Recommendations may include a specific type of demographic, item, a specific brand or service for a type of item, a specific retailer for the item, etc.

Navigation of the network-based marketplace 112 may be facilitated by one or more navigation and context application(s) 206. For example, a context application may, inter alia, enable key word searches of item listings associated with a context defined by a user profile of a particular consumer. The context can include an association between the user profile data in the user profile and item feature sets related to items in the item listings. The item listings can include listings from a group including products or services or both. The item feature set data and data defining the association between the user profile data in the user profile and item feature sets may be retrieved from the network-based marketplace 112 (e.g., databases 136) or from various other remote sources, such as other network sites, other users (e.g., experts or peers), etc. In one embodiment, a toolbar installed on a browser application may be used for functions including interactive and navigation functions to create a new user profile, selectively add a uniform resource locator (URL) associated with the created user profile, and create notations regarding research and general matters associated with the user profile. These functions may be user accessible by many methods known in the art, including a web form interface (HTML or embedded Java) or a stand-alone application interface. For example, a navigation application may include a browser that allows users via an associated user interface to browse a user's user profile, various item listings, item feature sets, contexts, catalogues, inventories, social networks, and review data structures within the network-based marketplace 112. In one embodiment, the user interface includes selectable elements in the form of tabs to separate out various categories of user profile data that when selected generate a list associated with the category. For example, a tab for "My Notes," a tab for "Everyone's Notes," a tab for "Buy," and a tab for "Sell". Various other navigation applications (e.g., an external search engine) may be provided to supplement the search and browsing applications.

In one embodiment, using filtering application(s) 208, the user or feed distribution engine user may customize result data associated with a user profile or listing search results. The filtering application(s) 208 may generate the result data according to one or more rules provided by the network-based marketplace 112 and the user receiving the filtered result data. For example, as discussed above with reference to the reputation application(s) 204, the user may only want the user profile to match on item listings pertaining to item reviews from other users with a greater than 3 out of 5 star reputation rating. In another example, the user may only want user profile data to match on item listings pertaining to item listings with a particular feature set or attribute set. For example, the user may only want result data for digital cameras with equal or greater than 5 megapixels. Additionally, the filtering rules may be combinable or modifiable to broaden or narrow the scope of the result data. The filtering application(s) 208 may also be used to implement rules for granting or allowing access to the user profile data.

Messaging application(s) 214 may be used for the generation and delivery of messages to users of the network-based marketplace 112. For example, the user may like a particular review or research from another user and may wish to contact the user for additional information. In one embodiment, the messaging application(s) 214 may be used in conjunction with the social networking application(s) 210 to provide promotional and/or marketing (e.g., targeted advertisements associated with the user profile) to the user or a related user from vendors and community members that may have offerings related to the user profile.

Item list application(s) 216 may be used in the network-based marketplace 112 by the user to create an item list based on selecting one or more items and services to purchase (or sell, auction, lease, or donate), which may be at least partially based on result data associated with the user's shopping experience. The item list application(s) 216 may be accessed via a user interface that allows the user to create and use the item list. Additionally, the user may selectively share this list within a community or to all users to gain or solicit additional data such as vendor recommendations for each purchase or vendor reviews for vendors that may be present in the list.

In one embodiment, electronic shopping cart application(s) 218 are used to create a shared electronic shopping cart used by a user to add and store items from a shopping list generated by the user (e.g., by making selections from a "Buy" tab). The electronic shopping cart application(s) 218 may facilitate the transactions for each item on the list by automatically finding the items in the electronic shopping cart across at least one or all of a set of vendors, a comparison shopping site, an auction site, other user's ads, etc. In one embodiment, a multitude of transactions may appear as one transaction based on the selection of "Bulk Purchase." In various embodiments, the selection criteria for which vendor or vendors to purchase from may include, but is not limited to, criteria such as lowest cost, fastest shipping time, preferred or highest rated vendors or sellers, or any combination thereof.

It will be appreciated that one or more of the various sample networking and marketplace application(s) 130, 132 may be combined into a single application including one or more modules. Further, in some embodiments, one or more applications may be omitted and additional applications may also be included.

Figure 3:
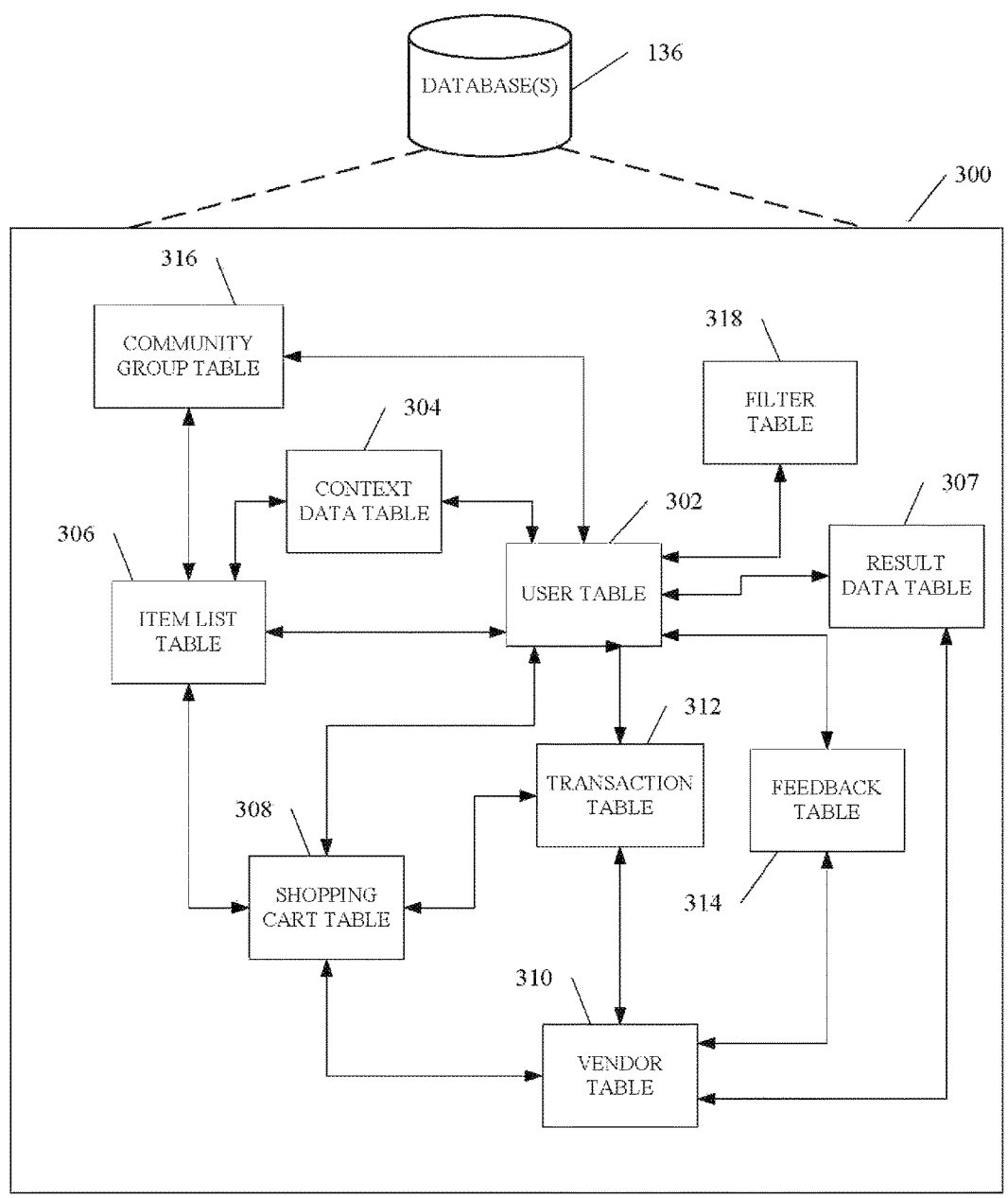
FIG. 3 is a high-level entity-relationship diagram, according to an example embodiment, illustrating various tables that may be maintained within a database to support networking and marketplace applications.

FIG. 3 is a high-level entity-relationship diagram, in accordance with an example embodiment, illustrating various tables 300 that may be maintained within the database(s) 136 (see FIG. 1), which may be utilized by and support the networking and marketplace application(s) 130 and 132, respectively. A user table 302 may contain a record for each registered user of the network-based marketplace 112, and may include identifier, address and financial instrument information pertaining to each such registered user. In one embodiment, a user operates as one or all of a user profile creator, a seller, a buyer, within the network-based marketplace 112.

The context data table 304 maintains a record of the one or more user profiles and/or listings created by or related to a user. As discussed above, this may include user profile identifiers and/or listing identifiers that may include words and/or phrases from the general to the specific for a consumer class, specific consumer, product/service class, or a specific product/service. Context data in context data table 304 can also include associations between the user profile data in the personalized consumer profiles and item feature sets related to items in the item listings. The item listings can be listings for products or services or both. The personalized consumer profiles, item feature set data, and data defining the association between the user profile data in the personalized consumer profiles and item feature set data may be stored into or retrieved from the context data table 304 of database(s) 136. In one embodiment, each word in a phrase may be a tag linked to another user profile and its associated data. For example "Canon" may be a selectable element within the user interface as a tag that results in the selector receiving more general data regarding Canon products. Similarly, "camera" may be selected to receive more general data regarding cameras, in this case both digital and film cameras.

The tables 300 may also include an item list table 306 which maintains listing or item records for goods and/or services that were created using the item list application(s) 216. In various embodiments, the item list may be created and shared with a community group or to all users in part to solicit feedback regarding listed or potential vendors.

Each listing or item record within the item list table 306 may furthermore be linked to one or more electronic shopping cart records within a electronic shopping cart table 308 and to one or more user records within the user table 302 and/or a vendor table 310, so as to associate a seller or vendor and one or more actual or potential buyers from the community group with each item record.

A transaction table 312 may contain a record for each transaction pertaining to items or listings for which records exist within the item list table 306. For example, the transaction table 312 may contain a purchase or sales transaction of an item of the item list by a consumer.

In one example embodiment, a feedback table 314 may be utilized by one or more of the reputation application(s) 204 to construct and maintain reputation information associated with users (e.g., members of the community group, sellers, etc.).

Group(s) of users found in a community group table 316 may be selected by a user to be members of a community group having access to user profile data and an item listing associated with the electronic shopping cart.

A filter table 318 may be used to sort and filter data associated with a user profile. The sorted or filtered data are then stored in the result data table 307 and linked to the user profile creator via a user profile identifier. Various types of filters and associated rules were discussed above with reference to the filtering application(s) 208 in FIG. 2.

Figure 4:
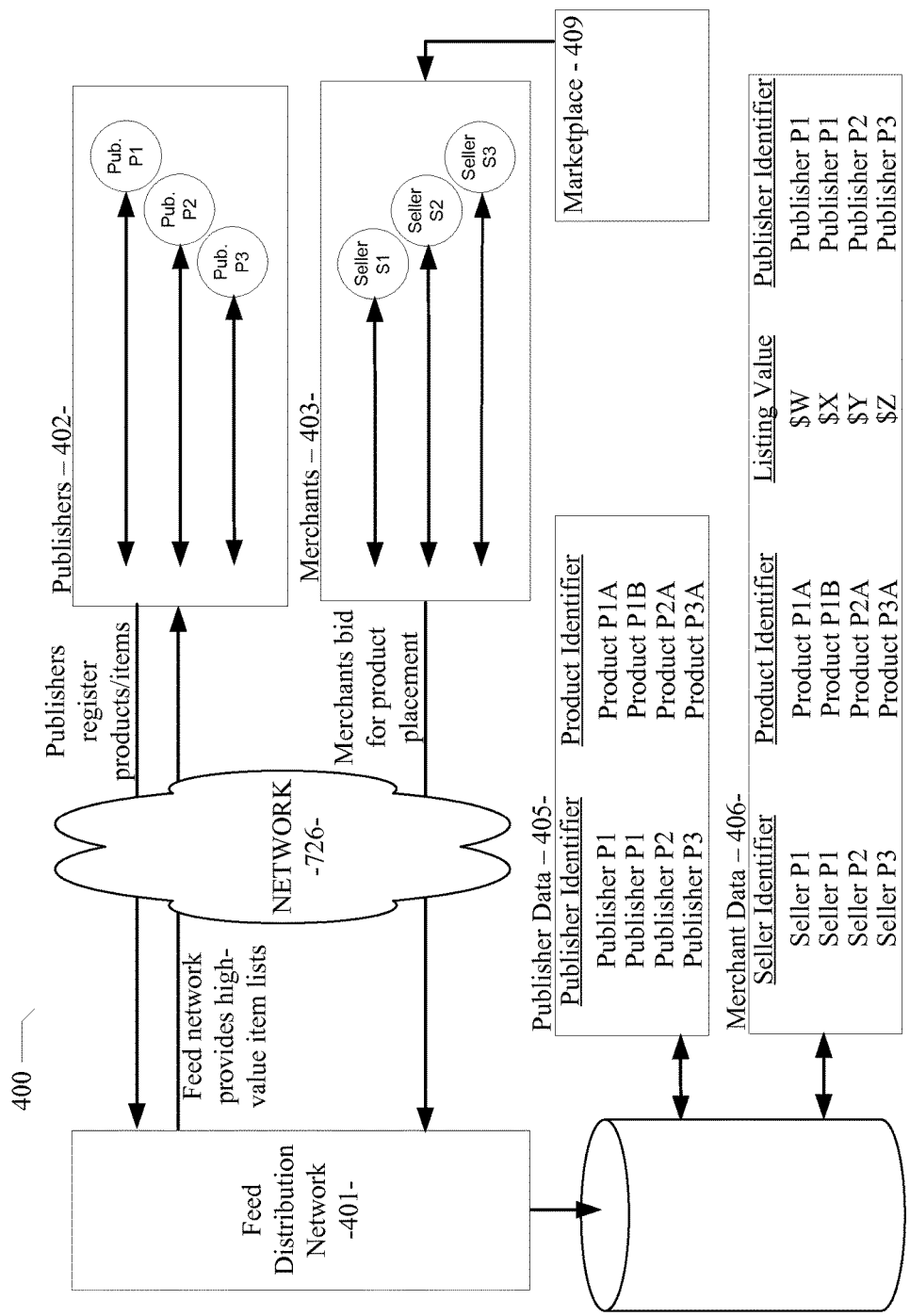
FIG. 4 is a system diagram illustrating an example embodiment of the system in which a feed distribution network of a particular embodiment can operate.

FIG. 4 is a system diagram illustrating an example embodiment 400 of the system in which a feed distribution network 401 of a particular embodiment can operate. As shown, the feed distribution network 401 can communicate via a network 726 with a plurality of publisher sites 402 and a plurality of merchant sites 403. In one embodiment, the feed distribution network 401 can collect feed-related data from the publisher sites 402 and the merchant sites 403. For example, the publisher sites 402 can convey, to the feed distribution network 401, information related to product information appearing in a particular publisher's content on their site. The publisher sites 402 can also convey to the feed distribution network 401 information related to keywords or search queries used on the publisher sites 402 that correspond to the product information appearing in a particular publisher's content on their site. In this manner, publisher sites 402 can register products/items with the feed distribution network 401. Using this information, the feed distribution network 401 can generate a Publisher data set 405. The Publisher data set 405 can be used to store information related to the connections or relationships between products or items appearing in a particular publisher's content (e.g., publisher content items) and the identifiers of the corresponding publisher sites. An example of the content of the Publisher data set 405 is shown in FIG. 4.

Similarly, the feed distribution network 401 can collect feed-related data from the merchant sites 403. For example, merchant sites 403 can be used by merchants, advertisers, or other users to bid on keywords or search terms that correspond to a particular merchant's products/items. These merchant bids or this merchant value information can be conveyed to the feed distribution network 401 via network 726. Using this merchant bid information, the feed distribution network 401 can generate a Merchant data set 406. The Merchant data set 406 can be used to store information related to the connections or relationships between products or items appearing in a particular publisher's content, the identifiers of the corresponding publisher sites, the merchant bids corresponding to the particular products/items, and the merchant or seller associated with each bid. An example of the content of the Merchant data set 406 is shown in FIG. 4. As described in more detail below, the merchant bids can be used by the feed distribution network 401 to facilitate the placement of product/item listings at publisher sites 402 in a manner that corresponds to the value of each merchant bid.

Figure 5:
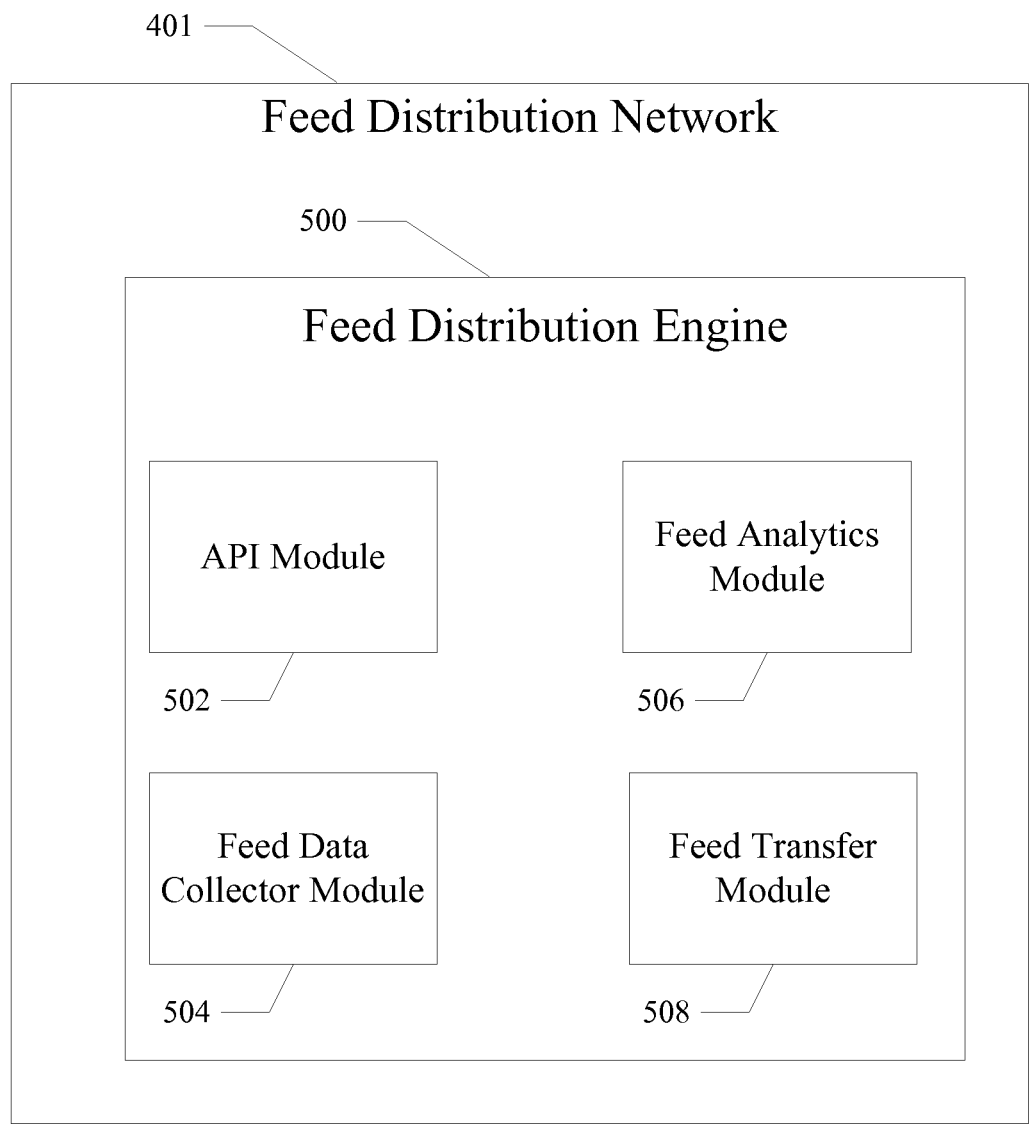
FIG. 5 is a block diagram illustrating an example embodiment of the components of a feed distribution engine of a particular embodiment.

FIG. 5 illustrates an example embodiment of functional modules or tools pertaining to the feed distribution engine 500 of a particular embodiment. It will be appreciated that the applications and associated modules may be executed within any portion of the network system 100, (e.g., the server machine 112). Additionally, the modules discussed herein are for example only and it can be appreciated these modules and applications may be combined into one or many modules and applications without departing from the scope of the methods and systems described herein.

In the particular embodiment, the feed distribution network 401 may include a feed distribution engine 500. The feed distribution engine 500 of a particular embodiment, as shown in FIG. 5, can include a number of features, applications, services, tools, or modules, such as:

- API Module 502—APIs for the feed distribution service.
- Feed Data Collector Module 504—Collection of publisher and merchant data.
- Feed Analytics Module 506—Analysis of item listings in view of publisher and merchant information and generation of a high-value set of item listings.
- Feed Transfer Module 508—Transfer the high-value set of item listings to corresponding publishers.

These feed distribution engine 500 modules of a particular embodiment are described in more detail below.

In a particular embodiment, the database 404 can include the following elements:

- The database 404 can be used to store data for the feed distribution network 401 application.
- The database 404 can have tables to store all data posted by the features described herein.
- The database 404 can include a Publisher data set 405, which includes information related to the connections or relationships between products or items appearing in a particular publisher's content and the identifiers of the corresponding publisher sites.
- The database 404 can include a Merchant data set 406, which includes information related to the connections or relationships between products or items appearing in a particular publisher's content, the identifiers of the corresponding publisher sites, the merchant bids corresponding to the particular products/items, and the merchant or seller associated with each bid.

Application Programming Interface (API) Module 502

All APIs supported by the API module 502 can be based on a Service Oriented Architecture. When responding to a "post" request by the client, the API can write data into a database table and reply back to the client with success or failure codes. As described above, a publisher site 402 can use APIs provided by API module 502 to register particular products or items with the feed distribution network 401. Similarly, a merchant site 403 can use APIs provided by API module 502 to submit a bid related to particular products or items to the feed distribution network 401. The APIs provided by API module 502 can also be used by the feed distribution network 401 to transfer high-value feeds to the publisher sites 402.

Feed Data Collector Module 504

When a publisher site 402 uses APIs provided by API module 502 to register particular products or items with the feed distribution network 401, the feed data collector module 504 receives this data from the publisher site 402 and updates the corresponding portions of the publisher data set 405 in database 404. The feed data collector module 504 can also augment the data stored in publisher data set 405 with data retrieved from other sources. For example, additional product information, related keyword or search term information, or other information related to a product/item registered by a publisher site 402 can also be added to the publisher data set 405 by the feed collector module 504. Similarly, the feed collector module 504 can receive merchant data from a merchant site 403. The feed collector module 504 updates the corresponding portions of the merchant data set 406 in database 404. The feed data collector module 504 can also augment the data stored in merchant data set 406 with data retrieved from other sources. For example, additional product information, related keyword or search term information, related bid or purchase information, publisher information, item value or bid value information, or other information related to a bid submitted by a merchant site 403 can also be added to the merchant data set 406 by the feed collector module 504.

Feed Analytics Module 506

Figure 6:
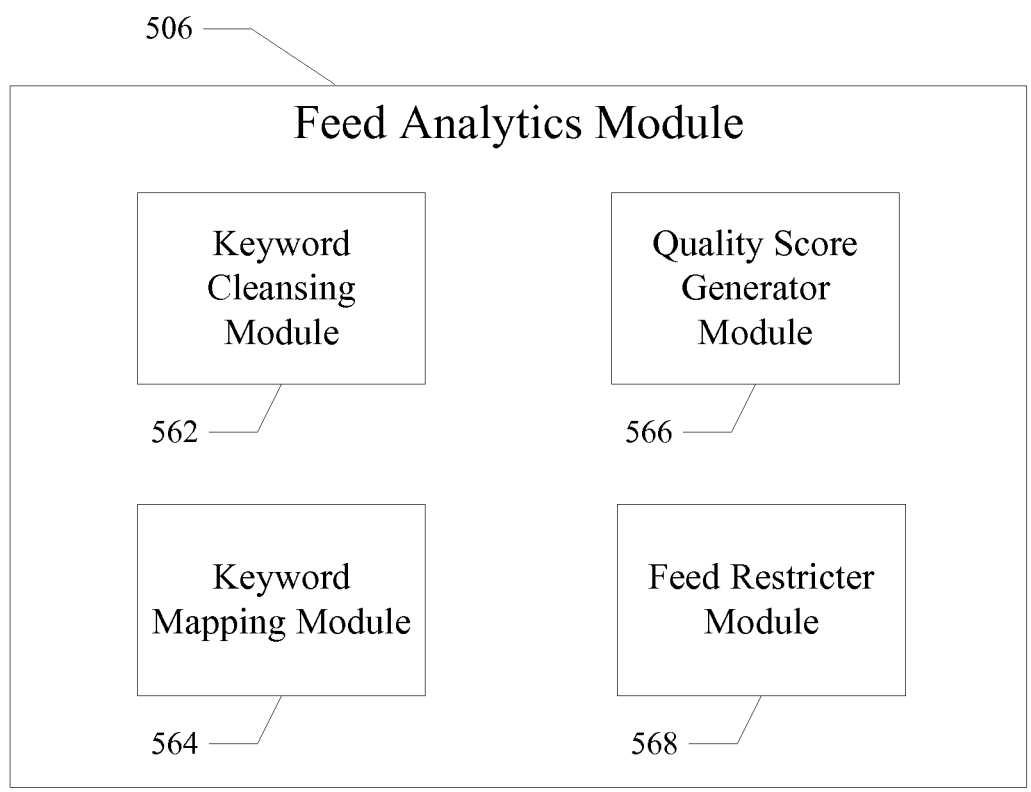
FIG. 6 is a block diagram illustrating an example embodiment of the components of a feed analytics module of a particular embodiment.

Once the publisher data set 405 and merchant data set 406 are populated with publisher data and merchant data as described above, the feed analytics module 506 can use this data to generate high-value feeds for transfer to publisher sites 402. The feed analytics module 506 can be a web application. In the particular embodiment, the feed analytics module 506, as shown in FIG. 6, can include a number of features, applications, services, tools, or modules, such as:

Keyword Cleansing Module 562
Keyword Mapping Module 564
Quality Score Generator Module 566
Feed Restrictor Module 568

These feed analytics module 506 components of a particular embodiment are described in more detail below.

Feed Transfer Module 508

Once the feed analytics module 506 generates a set of high-value feeds, this feed data can be transferred to the publisher sites 402 using the feed transfer module 508. The feed transfer module 508 can use one or more of the APIs provided by the API module 502 to effect the transfer of the high-value feeds to the corresponding publisher sites 402.

Keyword Cleansing Module 562

The keyword cleansing module 562 processing of a particular embodiment is described in more detail herein. Some conventional keyword processing systems store even the slightest differences in text strings as distinct listings/queries/records. For example, two phrases may have the same keywords, but one may have an additional space in the keyword string. Conventional systems create distinct records for these keyword variations even though these variations would be considered the same keyword in some conventional search engines, thus triggering the display of the same listings. Thus, it is beneficial to pre-process or clean the product identifiers, keywords, or search queries received from a particular publisher site to the extent possible. The following pre-processing actions can be implemented to increase the likelihood that the keyword processing will appropriately match the product identifiers, keywords, or search queries with corresponding bids submitted by merchant sites. Various examples of this pre-processing are provided below:

Singular/Plural: Treat all versions of listing text or user queries to be the same if they are singular/plural versions. In one embodiment, one can compare all the text strings with each other and convert all keyword variations to a common form (e.g. the singular form). Then for every record, pre-process the keyword: if the text string is a singular or plural version of the keyword, then set the text string to be the keyword. If it is not feasible (computationally expensive) to check all text strings against each other first, then the following actions can be implemented.

For each record, compare the keyword with the text string: if the text string is a singular or plural version of the keyword, then set the text string to be the keyword. Here are some of forms of singular/plurals that illustrate the text string conversion:
(ES)—beach vs. beachES
(S)—train vs trainS
(IES)—baby vs. babies
When moving a keyword to exact match, both versions (singular AND plural) should be provided.

Lower/Upper Case: Conventional systems store the same phrase separately if it was entered in lower case vs. upper case. An example embodiment converts all text strings to a common case (e.g. lower case).

De-duping: Remove duplicate keywords or phrases.

Word Re-ordering: In one embodiment, all text strings are compared together before comparing them against keywords. In another embodiment, the text strings are checked to determine if they are simply a reordering of words of the keyword. If so, set the text string to be the keyword. For example, the text string, 'Paid Search Alley Rocks' would be made the same as 'Rocks Alley Search Paid'.

Filler words: The pre-processing functionality provided in the computer-implemented method and system described herein suppresses words such as 'and' '&' '+' 'the' 'a', space, and some special characters, etc.

Multiple spaces between words: If multiple spaces appear between words, the spaces are compressed to one space.

Quotation Marks around/within queries: Quotes (single or double quotes) can be removed from a user query.

Misspellings: In one embodiment, misspellings in a text string can be corrected.

The following actions can be used in various embodiments to process user queries and related keywords for various conventional search engines.

1) Retrieve all keywords from a search engine that had more than a threshold number of clicks (e.g. >=100 clicks) in a previous time period (e.g. 2 months).
2) Extract all user queries for each of the keywords in step 1 in a previous time period (e.g. two months).
   a. Also retrieve metrics such as the number of clicks and the number of bids for that keyword & user query combination/record.
   b. Delete any record that has a blank user query stored.
3) In the user query, replace any % XY characters (encoded Hex characters) with a blank.
4) As described above, perform the following actions in the following order:
   a. Convert the keyword & user query to lower case.
   b. Replace '+' and '&' in the user query with blanks.
   c. Replace 'a', 'the' 'and' in user query with blanks. (Note the padded pre & post spaces in these strings ensures these strings are not replaced if they are part of a word; they are only replaced if they appear between words).
   d. Delete any occurrences of single or double quotes in the user query.
   e. Compress multiple spaces between words to be one space.
   f. If the user query is a singular or plural version of a keyword, set the user query to be the keyword.
5) Group all records by keyword and user query. Get aggregate metrics at this level.
6) For each keyword, calculate and store the following fields:
   a. Count of number of associated user queries.
   b. Sum of clicks across all user queries.
   c. Sum of Bids across all user queries.

d. Note that the sum of clicks or bids across all user queries for a given keyword, is not always the same as the number of clicks or bids for the keyword.

7) Based on the sum of clicks or bids across all user queries for a given keyword and given that the keyword level Costs & Revenue is known, assign costs & revenue (and thus profit) to each user query. Use the ratio of clicks/bids at the user query level, relative to the Total clicks/bids across all user queries for that keyword (as calculated in step 6 above) to allocate the appropriate amount of keyword Costs/Revenue to the user query in question.

8) Choose all user queries that were profitable and had a quantity of clicks greater than a configurable threshold of click activity (e.g. >=50 clicks) thereby ensuring a minimum threshold of 'popularity' for the user query.

The keyword cleansing module 562 processing of a particular embodiment can also employ pattern rules. Pattern rules can infer information from the usage of keywords based on a context in which the keywords are used. In a particular context, particular keywords or phrases can be extracted and/or normalized to improve the accuracy of the keyword mapping/matching process.

Keyword Mapping Module 564

The keyword mapping module 564 processing of a particular embodiment is described in more detail herein. Once a set of product identifiers or keywords have been pre-processed as described above, the keywords can be matched against the content in a set of listings that can be served to the publisher sites 402. Because it is not feasible to serve all available listings to the publisher sites 402, it is important to pick only the highest value listings for transfer to the publisher sites 402. The keyword mapping module 564 identifies the particular listings at a host site that include keywords that match to the set of product identifiers, items, or keywords registered by the publisher sites. These matched listings can be provided as input to the quality score generator module 566, which can determine how relevant a particular listing is to a particular keyword being processed. The set of product identifiers, items, or keywords can also be matched to the titles of the set of listings. A unique identifier can be assigned to each member of the set of product identifiers, items, or keywords.

Quality Score Generator Module 566

The quality score generator module 566 processing of a particular embodiment is described in more detail herein. The quality score generator module 566 processes the set of matched listings produced by the keyword mapping module 564 to determine a quality or relevancy score for each keyword or item as related to the matching listings. The quality score can be based on a number of factors including:

(1) A number of occurrences of the keyword in the particular listing;
(2) A count of a number of associated user queries;
(3) A sum of clicks related to the keyword across all user queries;
(4) A sum of bids related to the keyword across all user queries; and
(5) A costs/revenue value associated with the keyword.

Once the quality score for a particular keyword or item is generated by the quality score generator module 566, the set of keywords can be ranked in an ordering of the associated quality scores. A set of matching listing items can also be ranked in an ordering of the associated quality scores. In this manner, the highest quality keyword/item and the corresponding highest quality listing is ranked at the top of the list and the lowest quality keyword/item and the corresponding lowest quality listing is ranked at the bottom of the list.

In an alternative embodiment, various quality scoring models can be used. For example, one quality scoring model can focus on the leaf-category performance of the listing items. In this model, the average conversion rates per leaf category and per price segment can be used to determine a quality score for each listing item. In a second alternative quality scoring model, the attributes of sellers corresponding to the listing items can be used to score the listing items. In a third alternative quality scoring model, the attributes of the listing items themselves can be used to score the listing items. In a fourth alternative quality scoring model, various combinations of several quality scoring models can be used. Ultimately, a quality score corresponding to each individual listing item can be generated using any of the methods described above.

Feed Restrictor Module 568

The feed restrictor module 568 processing of a particular embodiment is described in more detail herein. Once the set of keywords and listing items have been ranked in an ordering of the associated quality scores, the feed restrictor module 568 can discard a pre-determined portion of the sorted list. Typically, the items at the end of the sorted list are discarded to retain the highest-value items in the list. In this manner, the highest-value items, and the listings associated with these high-value items can be served to the corresponding publisher sites 402. The portion of the sorted list that is discarded can be defined by an item number 'n'. The item number 'n' designates an index of an item in the sorted list that represents the lowest value item that will be included in the list delivered to the publisher sites 402. The value of 'n' can be chosen to deliver a fixed number of listings to the publisher sites 402. The value of 'n' can also be chosen to deliver listings to the publisher sites 402 that are of a minimal level of quality based on the item quality score. In this manner, the feed restrictor module 568 can be used to regulate the quantity and quality of listings delivered to the publisher sites. When the feed restrictor module 568 has completed processing the sorted list and the high value listings have been identified as described above, the high value listings can be delivered to the corresponding publisher sites 402 using the feed transfer module 408.

In an alternative embodiment, the feed restrictor module 568 can partition the sorted list to various portions. The various portions can correspond to related product identifiers, keywords, or search strings. Each portion of the sorted list can be truncated at a pre-determined quality score value. In this manner, the resulting processed list can provide wider coverage over a broader range of product identifiers, keywords, or search strings. The transfer of only high-quality listings ensures a better user experience and the likelihood of higher revenue and conversion rates for the merchants.

Figure 7:
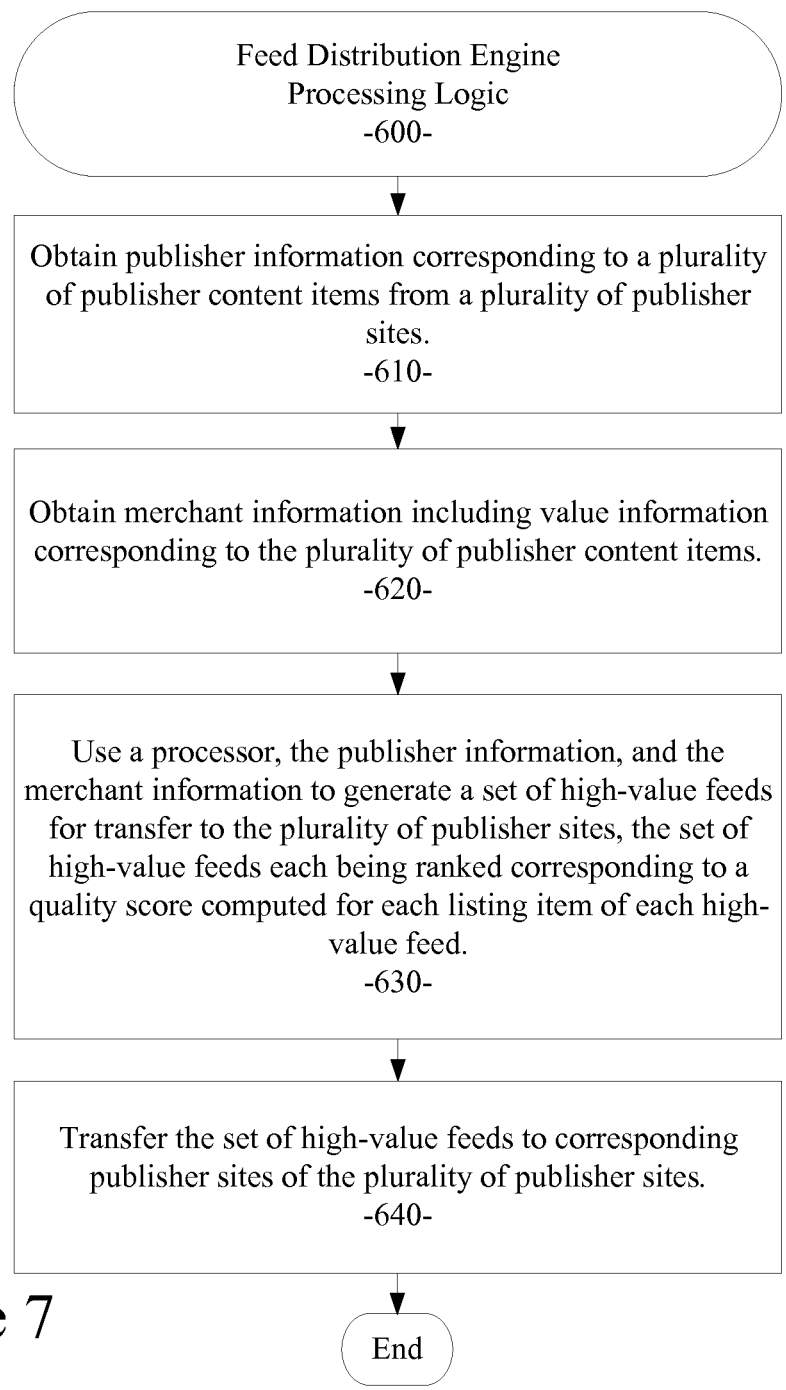
FIG. 7 is a processing flow chart illustrating an example embodiment of a feed distribution engine as described herein.

FIG. 7 is a processing flow chart illustrating an example embodiment 600 of a feed distribution engine as described herein. The method of an example embodiment includes: obtaining publisher information corresponding to a plurality of publisher content items from a plurality of publisher sites (processing block 610); obtaining merchant information including value information corresponding to the plurality of publisher content items (processing block 620); using a processor, the publisher information, and the merchant information to generate a set of high-value feeds for transfer to the plurality of publisher sites, the set of high-value feeds each being ranked corresponding to a quality score computed for each listing item of each high-value feed (processing block 630); and transferring the set of high-value feeds to corresponding publisher sites of the plurality of publisher sites (processing block 640).

Figure 8:
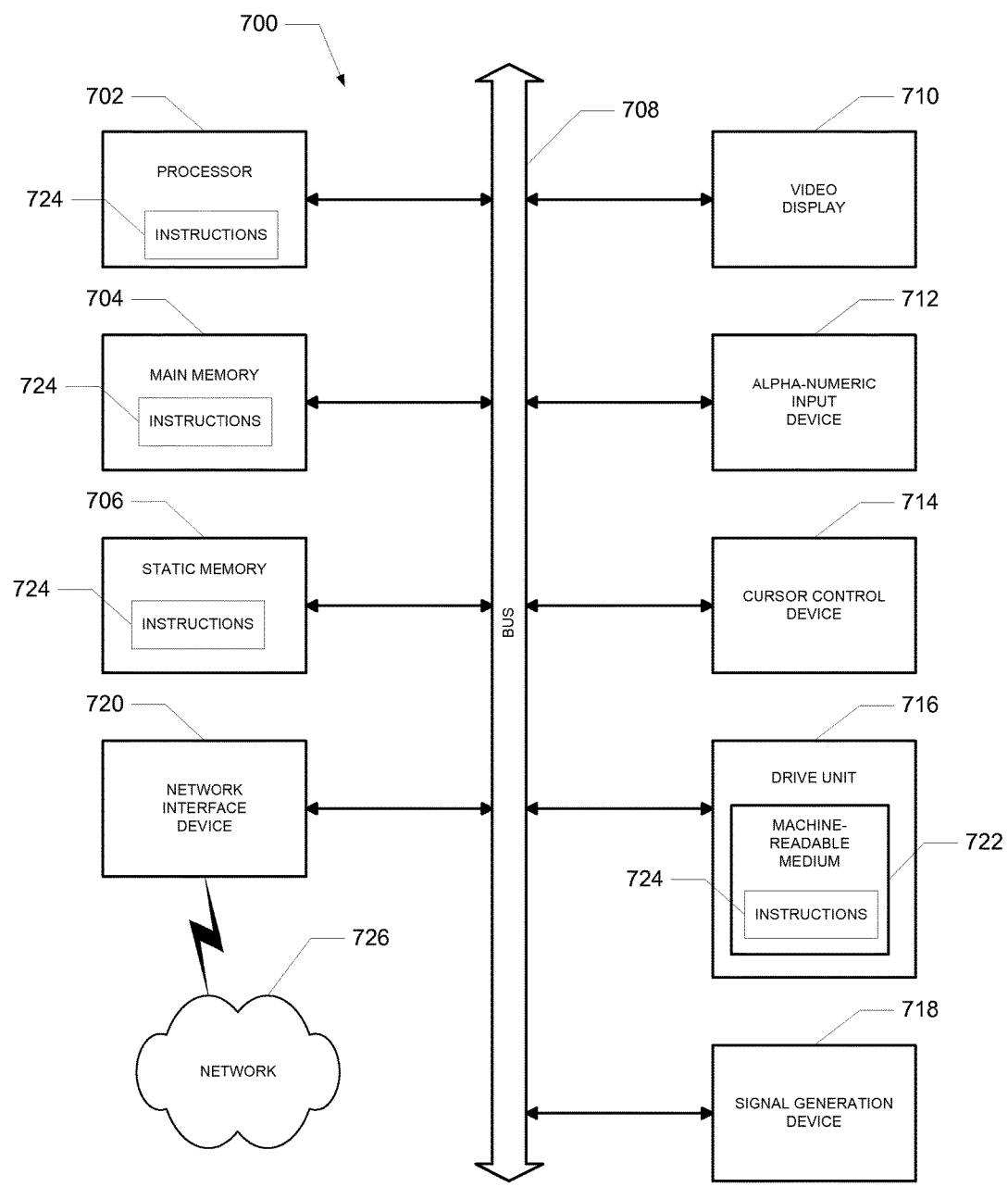
FIG. 8 shows a diagrammatic representation of machine in the example form of a computer system within which a set of instructions when executed may cause the machine to perform any one or more of the methodologies discussed herein.

FIG. 8 shows a diagrammatic representation of machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. A computer-implemented method comprising:
   obtaining publisher information corresponding to a plurality of publisher content items from a plurality of publisher sites, the publisher information comprising a plurality of user queries and a plurality of keywords corresponding to the plurality of publisher content items;
   obtaining merchant information including value information corresponding to the plurality of publisher content items;
   generating a merchant data set using the merchant information, the merchant data set comprising information related to relationships between products or items appearing in particular publisher content items, identifiers of publisher sites corresponding to the particular publisher content items, merchant bids corresponding to the products or items, and a merchant or seller associated with each merchant bid;
   generating, by a processor, a set of high-value feeds based on the publisher information and the merchant information, wherein generating the set of high-value feeds comprises:
      allocating relative profits to each user query based on at least one of a sum of clicks or a sum of bids for each user query determined from the merchant data set;
      selecting a set of user queries satisfying a threshold profitability; and
      determining, using at least in part the set of user queries selected, a quality score for each listing item corresponding to a keyword from the plurality of keywords, wherein the set of high-value feeds comprises listing items selected using qualities scores; and
   transmitting the set of high-value feeds to corresponding publisher sites of the plurality of publisher sites.

2. The computer-implemented method of claim 1, further comprising generating a publisher data set using the publisher information, the publisher data set comprising information related to relationships between products or items appearing in particular publisher content items and identifiers of publisher sites corresponding to the particular publisher content items.

3. The computer-implemented method of claim 1, wherein obtaining the publisher information includes providing an application programming interface (API) for the plurality of publisher sites.

4. The computer-implemented method of claim 1, wherein generating the set of high-value feeds further comprises performing a keyword cleansing operation to pre-process the publisher information.

5. The computer-implemented method of claim 1, wherein generating the set of high-value feeds further comprises obtaining a revenue value associated with each listing item of each high-value feed.

6. The computer-implemented method of claim 1, wherein generating the set of high-value feeds further comprises matching keywords against content in a set of listings.

7. The computer-implemented method of claim 1, wherein generating the set of high-value feeds further comprises ranking the listing items in the set of listing items based on the quality scores and restricting a pre-determined portion of the ranked listing items from being in the set of high-value feeds.

8. The computer-implemented method of claim 7, wherein the pre-determined portion of the ranked listing items comprises listing items that do not satisfy a minimum quality score threshold.

9. A system comprising:
at least one processor; and
a non-transitory computer-readable medium storing executable instructions that, when executed, cause the at least one processor to perform operations comprising:
obtaining publisher information corresponding to a plurality of publisher content items from a plurality of publisher sites, the publisher information comprising a plurality of user queries and a plurality of keywords corresponding to the plurality of publisher content items;
obtaining merchant information including value information corresponding to the plurality of publisher content items;
generating a merchant data set using the merchant information, the merchant data set comprising information related to relationships between products or items appearing in particular publisher content items, identifiers of publisher sites corresponding to the particular publisher content items, merchant bids corresponding to the products or items, and a merchant or seller associated with each merchant bid;
generating a set of high-value feeds based on the publisher information and the merchant information, wherein generating the set of high-value feeds comprises:
allocating relative profits to each user query based on at least one of a sum of clicks or a sum of bids for each user query determined from the merchant data set;
selecting a set of user queries satisfying a threshold profitability; and
determining, using at least in part the set of user queries selected, a quality score for each listing item corresponding to a keyword from the plurality of keywords, wherein the set of high-value feeds comprises listing items selected using qualities scores; and
transmitting the set of high-value feeds to corresponding publisher sites of the plurality of publisher sites.

10. The system of claim 9, wherein the operations further comprise generating a publisher data set using the publisher information, the publisher data set comprising information related to relationships between products or items appearing in particular publisher content items and identifiers of publisher sites corresponding to the particular publisher content items.

11. The system of claim 9, wherein obtaining the publisher information includes providing an application programming interface (API) for the plurality of publisher sites.

12. The system of claim 9, wherein generating the set of high-value feeds further comprises performing a keyword cleansing operation to pre-process the publisher information.

13. The system of claim 9, wherein generating the set of high-value feeds further comprises obtaining a revenue value associated with each listing item of each high-value feed.

14. The system of claim 9, wherein generating the set of high-value feeds further comprises matching keywords against content in a set of listings.

15. The system of claim 9, wherein generating the set of high-value feeds further comprises ranking the listing items in the set of listing items based on the quality scores and restricting a pre-determined portion of the ranked listing items from being in the set of high-value feeds.

16. A non-transitory computer-readable medium storing executable instructions that, when executed, cause at least one processor to perform operations comprising:
obtaining publisher information corresponding to a plurality of publisher content items from a plurality of publisher sites, the publisher information comprising a plurality of user queries and a plurality of keywords corresponding to the plurality of publisher content items;
obtaining merchant information including value information corresponding to the plurality of publisher content items;
generating a merchant data set using the merchant information, the merchant data set comprising information related to relationships between products or items appearing in particular publisher content items, identifiers of publisher sites corresponding to the particular publisher content items, merchant bids corresponding to the products or items, and a merchant or seller associated with each merchant bid;
generating a set of high-value feeds based on the publisher information and the merchant information, wherein generating the set of high-value feeds comprises:
allocating relative profits to each user query based on at least one of a sum of clicks or a sum of bids for each user query determined from the merchant data set;
selecting a set of user queries satisfying a threshold profitability; and
determining, using at least in part the set of user queries selected, a quality score for each listing item corresponding to a keyword from the plurality of keywords, wherein the set of high-value feeds comprises listing items selected using qualities scores; and
transmitting the set of high-value feeds to corresponding publisher sites of the plurality of publisher sites.

17. The computer-readable medium of claim 16, wherein the operations further comprise generating a publisher data set using the publisher information, the publisher data set comprising information related to relationships between products or items appearing in particular publisher content items and identifiers of publisher sites corresponding to the particular publisher content items.

18. The computer-readable medium of claim 16, wherein obtaining the publisher information includes providing an application programming interface (API) for the plurality of publisher sites.

19. The computer-readable medium of claim 16, wherein generating the set of high-value feeds further comprises performing a keyword cleansing operation to pre-process the publisher information.

20. The computer-readable medium of claim 16, wherein generating the set of high-value feeds further comprises obtaining a revenue value associated with each listing item of each high-value feed.

* * * * *